US012661970B2

(12) United States Patent
Kaltenbach et al.

(10) Patent No.: US 12,661,970 B2
(45) Date of Patent: Jun. 23, 2026

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Fabian Kutter, Kressbronn (DE); Thomas Martin, Weissensberg (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/626,589

(22) Filed: Apr. 4, 2024

(65) Prior Publication Data

US 2024/0336124 A1    Oct. 10, 2024

(30) Foreign Application Priority Data

Apr. 4, 2023    (DE) ..................... 10 2023 203 096.9

(51) Int. Cl.
 *B60K 6/365*     (2007.10)
 *B60K 1/00*      (2006.01)

(52) U.S. Cl.
 CPC ........ *B60K 6/365* (2013.01); *B60K 2001/001* (2013.01); *F16H 2200/2064* (2013.01); *F16H 2200/2094* (2013.01)

(58) Field of Classification Search
 CPC .. B60K 6/365; B60K 2001/001; B60K 6/547; B60K 17/046; B60K 17/16;
(Continued)

(56) References Cited

U.S. PATENT DOCUMENTS 11,668,380 B2 * 6/2023 Renner .................. B60K 17/08
                                                    475/150
2015/0219193 A1   8/2015 Nitsch et al.
(Continued)

FOREIGN PATENT DOCUMENTS

DE    10 2012 025 369 A1    7/2014
DE    10 2014 006 132 A1    6/2015
(Continued)

OTHER PUBLICATIONS

German Patent Office, German Search Report issued in German patent application No. 10 2023 203 096.9 (Nov. 29, 2023).
(Continued)

*Primary Examiner* — Tisha D Lewis
(74) *Attorney, Agent, or Firm* — Secant IP, PLLC

(57)    ABSTRACT

A motor vehicle transmission (3) includes a drive shaft (6), an output shaft (7), and a first planetary gear set (P1), a second planetary gear set (P2) and a third planetary gear set (P3). The drive shaft (6) is provided for coupling to at least one drive engine. Furthermore, exactly one first shifting element (B) and one second shifting element (A) are provided, at least functionally, for the representation of different force flow paths between the drive shaft (6) and the output shaft (7) via the planetary gear sets (P1, P2, P3). The invention also relates to a drive unit (1), an electrically driven motor vehicle drive axle, a hybrid or electric vehicle and a method for operating a motor vehicle transmission.

17 Claims, 5 Drawing Sheets

(58) Field of Classification Search
CPC ................... F16H 57/023; F16H 57/08; F16H
2200/2064; F16H 2200/2904
See application file for complete search history.

(56) References Cited

U.S. PATENT DOCUMENTS

| | | | |
|---|---|---|---|
| 2016/0017961 A1 | 1/2016 | Beck et al. | |
| 2016/0040768 A1 | 2/2016 | Beck et al. | |
| 2017/0158041 A1 | 6/2017 | Ohnemus et al. | |
| 2018/0328465 A1* | 11/2018 | Warth ...................... | B60K 6/48 |
| 2020/0262293 A1* | 8/2020 | Glückler .................. | B60K 1/02 |
| 2023/0139069 A1* | 5/2023 | Rittler ................... | F16H 37/082 |
| | | | 475/204 |

FOREIGN PATENT DOCUMENTS

| | | |
|---|---|---|
| DE | 10 2014 218 613 A1 | 3/2016 |
| DE | 10 2017 004 898 A1 | 11/2018 |
| DE | 10 2017 006 262 A1 | 1/2019 |
| DE | 110 2017 222 723 A1 | 6/2019 |
| DE | 10 2018 000 186 | 7/2019 |

OTHER PUBLICATIONS

German Patent Office, German Search Report issued in German patent application No. 10 2023 203 097.7 (Nov. 23, 2023).
United States Patent Office, Non-Final Office Action issued in U.S. Appl. No. 18/626,791 (mailed May 21, 2025).

* cited by examiner

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2023 203 096.9, filed on 4 Apr. 2023, the contents of which are incorporated herein by reference in its entirety.

FIELD OF THE DISCLOSURE

The invention relates to a motor vehicle transmission for an at least partially electrically driven motor vehicle, in particular for an electrically driven motor vehicle drive axle, comprising a drive shaft, an output shaft, and a first planetary gear set, a second planetary gear set, and a third planetary gear set, the drive shaft being provided for coupling to at least one drive engine, the first planetary gear set, the second planetary gear set, and the third planetary gear set each having a first element, a second element, and a third element in the form of a sun gear, a planet carrier, and a ring gear, each having a first element, a second element, and a third element in the form of a sun gear, a planet carrier, and a ring gear, wherein at least functionally a first shifting element and a second shifting element are provided, by the selective actuation of which different force flow paths from the drive shaft via the planetary gear sets to the output shaft can be realized, and wherein the first element of the first planetary gear set is non-rotatably connected to the drive shaft. Furthermore, the invention relates to a drive unit for an at least partially electrically driven motor vehicle, an electrically driven motor vehicle drive axle for an at least partially electrically driven motor vehicle, a hybrid or electric vehicle and a method for operating a motor vehicle transmission.

BACKGROUND

In the case of motor vehicles designed as electric and hybrid vehicles, a motor vehicle gearbox is sometimes provided in a respective drive train between at least one electric engine and the drive wheels of the respective motor vehicle in order to be able to translate a drive movement of the at least one electric engine, in particular to the drive wheels at low speed. In addition to single-speed transmissions, automotive transmissions are also used in some cases in which two or more gears can be shifted.

DE 10 2017 006 262 A1 shows a motor vehicle transmission that is intended for use in an electric vehicle. In addition to a drive shaft and an output shaft, this motor vehicle transmission comprises three planetary gear sets, each of which is made up of elements in the form of a sun gear, a planet carrier, and a ring gear. When the vehicle transmission is installed, the drive shaft is used to connect to an upstream electric engine. In addition, the vehicle transmission has three shifting elements that are designed as non-positive shifting elements and whose selective actuation can be used to display different force flow paths from the drive shaft via the planetary gear sets to the output shaft.

SUMMARY

Based on the state of the art described above, it is now the object of the present invention to create an axially compact motor vehicle transmission by means of which at least one drive engine can be integrated in a suitable manner, and which can be realized with a low manufacturing cost.

This object is achieved by a motor vehicle transmission, as variously disclosed herein. The present disclosure also relates to a drive unit in which a motor vehicle transmission according to the invention is provided, and to an electrically driven motor vehicle drive axle for an at least partially electrically driven motor vehicle. The present disclosure further relates to a hybrid or electric vehicle. Finally, a method for operating a motor vehicle transmission is disclosed. Additional embodiments and advantages will be apparent from the present disclosure.

According to the invention, a motor vehicle transmission comprises a drive shaft, an output shaft, and a first planetary gear set, a second planetary gear set, and a third planetary gear set. The drive shaft is intended for coupling with at least one drive engine. In addition, the first planetary gear set, the second planetary gear set, and the third planetary gear set each have a first element, a second element, and a third element in the form of a sun gear, a planet carrier, and a ring gear. At least functionally, a first shifting element and a second shifting element are provided, the selective actuation of which allows different force flow paths from the drive shaft via the planetary gear sets to the output shaft.

For the purposes of the invention, a respective "shaft", such as the drive shaft and the output shaft of the motor vehicle transmission according to the invention, is to be understood as a rotatable component of the motor vehicle transmission via which a force flow path can be guided between components. The respective shaft can connect these components axially, radially, or both axially and radially with each other in the case of force flow path. The respective shaft can also be present as an intermediate piece, via which a respective component is connected purely radially, for example. Furthermore, depending on the course and connection to the components, the respective shaft can be designed as a solid shaft, a hollow shaft, or partly as a solid and partly as a hollow shaft. Alternatively, or additionally, the respective shaft can be designed in one or more parts.

For the purposes of the invention, "axial" means an orientation in the direction of a longitudinal central axis of the motor vehicle transmission, parallel to which axes of rotation of shafts of the motor vehicle transmission and the elements of the planetary gear sets are also oriented. The term "radial" then refers to an orientation in the diameter direction of a respective component of the transmission, in particular a respective shaft or a respective element of the planetary gear sets.

The motor vehicle transmission according to the invention has a drive shaft which, in the motor vehicle transmission according to the invention, is provided for producing a drive-side coupling to at least one drive engine, the drive shaft preferably being used for coupling to precisely one drive engine. For this purpose, the drive shaft is equipped in particular with a connection point at which the drive shaft can be coupled to the at least one drive engine. The connection of the at least one drive engine to the connection point of the drive shaft is made permanently when the vehicle transmission is installed, preferably if the drive engine is designed as an electric engine. Alternatively, an intermediate starting element, such as a hydrodynamic torque converter, a starting clutch, etc., can also be provided, via which the drive shaft can be or is coupled to the upstream drive engine at its connection point. This is realized in particular when the drive engine is designed as an internal combustion engine.

The coupling between the at least one drive engine and the drive shaft is preferably in the form that, in the installed state of the motor vehicle transmission and with the coupling established, a fixed speed ratio always prevails between a speed of the drive shaft of the motor vehicle transmission and a speed of the drive engine. Thus, within the scope of the invention, at least one further transmission stage, such as a spur gear stage and/or a planetary stage, may be provided between the drive shaft and the drive engine, via which a pre-transmission of a rotary movement of the drive engine to the drive shaft can be represented. However, the drive shaft is preferably used for a torsionally rigid connection with the at least one drive engine.

The vehicle transmission is in particular a hybrid or electric vehicle transmission, which is intended to be connected to a drive engine in the form of an electric engine on the drive shaft. As described above, a rotor of the electric engine can be coupled to the drive shaft of the transmission via at least one intermediate transmission stage. However, a rotor of the electric engine in the installed state of the motor vehicle transmission according to the invention is particularly preferably connected to the drive shaft in a rotationally fixed manner.

In the motor vehicle transmission according to the invention, the output shaft is provided in particular for establishing an output-side coupling of the motor vehicle transmission to components which, in the installed state of the motor vehicle transmission, follow the motor vehicle transmission in the direction of force flow path to the drive wheels of the respective motor vehicle.

In the motor vehicle transmission according to the invention, the drive shaft and the output shaft are arranged in particular coaxially to one another, wherein further preferably the first planetary gear set, the second planetary gear set, and the third planetary gear set are also each positioned coaxially to the drive shaft and the output shaft. This makes it possible to achieve a particularly compact design of the vehicle transmission in the radial direction.

The first planetary gear set, the second planetary gear set, and the third planetary gear set are each made up of a first element, a second element, and a third element, with one of these elements each being designed as a sun gear, one element each as a planet carrier, and one element each as a ring gear. The individual planetary gear set is preferably a minus planetary set in which the respective planet carrier rotatably supports at least one planet gear, wherein the at least one planet gear is in meshing engagement with both the respective sun gear and the respective ring gear. If the individual planetary gear set is designed as a minus planetary set, the first element of the respective planetary gear set is the respective sun gear, the second element of the respective planetary gear set is the respective planet carrier, and the third element of the respective planetary gear set is the respective ring gear. In particular, several planetary gears are rotatably mounted in the respective planet carrier.

Alternatively, one or more of the planetary gear sets could also be designed as a plus planetary set. In this case, at least one pair of planet gears is rotatably mounted in the respective planet carrier, of which one planet gear meshes with the respective sun gear and one planet gear is in meshing engagement with the respective ring gear. In addition, the planetary gears of the at least one planetary gear pair mesh with one another. In contrast to a design as a minus planetary gear set, the first element of the respective planetary gear set is preferably the respective sun gear, the second element of the respective planetary gear set is the respective ring gear, and the third element of the respective planetary gear set is the respective planet carrier. In comparison to a design as a minus planetary gear set, a stationary transmission ratio of the respective planetary gear set must also be increased by one. As already described above, however, the first planetary gear set, the second planetary gear set, and the third planetary gear set are preferably each a minus planetary set.

The invention now comprises the technical teaching that the first element of the first planetary gear set is non-rotatably connected to the drive shaft, while the second element of the first planetary gear set and the first element of the third planetary gear set are non-rotatably connected to one another. In addition, the third element of the first planetary gear set and the first element of the second planetary gear set are non-rotatably connected to each other. Furthermore, both the second element of the second planetary gear set and the third element of the third planetary gear set are fixed. The second element of the third planetary gear set is non-rotatably connected to the output shaft. At least functionally, exactly two shifting elements in the form of the first shifting element and the second shifting element are provided to represent the different force flow paths, wherein in the actuated state of the at least functionally provided first shifting element, the third element of the second planetary gear set is non-rotatably connected to the output shaft. In addition, according to a first variant of the invention, the third element of the second planetary gear set is non-rotatably connected to the second element of the first planetary gear set and the first element of the third planetary gear set in the actuated state of the at least functionally provided second shifting element. According to an alternative variant of the invention, however, the output shaft is non-rotatably connected to the third element of the first planetary gear set and the first element of the second planetary gear set in the actuated state of the at least functionally provided second shifting element.

Such a design of a motor vehicle transmission has the advantage that the coupling of the three planetary gear sets with each other according to the invention and the representation of the respective actuated states of the at least functionally provided shifting elements allow different gears to be realized, which are particularly suitable for the integration of a drive engine in the form of an electric engine. This can be achieved in a compact manner and also with low manufacturing costs, as only exactly two shifting elements need to be provided to represent the different force flow paths between the drive shaft and output shaft via the planetary gear sets, at least in terms of function. In this respect, an actuator can be designed in a simplified manner to represent the different force flow paths.

For the purposes of the invention, a "rotationally fixed connection" of components of the transmission is to be understood as meaning that these components, which are connected to one another in a rotationally fixed manner or are connected to one another in a rotationally fixed manner, are rigidly connected to one another and thus always have the same rotational speed. The components that are non-rotatably connected to each other or are non-rotatably connected to each other can be separate components that are attached to each other. Alternatively, components that are non-rotatably connected or non-rotatably connected to each other can also be designed in one piece and are thus present together as one component, wherein this is realized in particular when these components are arranged close to each other.

In the present case, the first element of the first planetary gear set and the drive shaft are permanently connected to each other in a rotationally fixed manner, so that the first element of the first planetary gear set and the drive shaft always rotate together. Furthermore, the second element of the first planetary gear set and the first element of the third planetary gear set are permanently connected to each other in a rotationally fixed manner and therefore always rotate together. The third element of the first planetary gear set and the first element of the second planetary gear set are permanently connected to each other and therefore always rotate together. There is also a permanent, non-rotatable connection between the second element of the third planetary gear set and the output shaft, which means that the second element of the third planetary gear set and the output shaft always have the same rotational speed. Furthermore, the second element of the second planetary gear set is permanently prevented from rotating, for which purpose the second element of the second planetary gear set is permanently fixed. Similarly, the third element of the third planetary gear set is also permanently stationary, in that the third element of the third planetary gear set is permanently fixed.

In the context of the invention, a fixed state of a component of the motor vehicle transmission is realized in particular by a rotationally fixed connection with a permanently fixed component, which may be a housing of the motor vehicle transmission, a part of the housing or a component permanently connected thereto in a rotationally fixed manner. In the case of a permanently fixed state, the respective component could also be designed in one piece with the fixed component. In this case, the second element of the second planetary gear set and/or the third element of the third planetary gear set could also be formed by a permanently fixed component.

The motor vehicle transmission according to the invention has, at least functionally, exactly two shifting elements in the form of the first shifting element and the second shifting element for the representation of different couplings of the drive shaft with the output shaft via the three planetary gear sets. The fact that a respective shifting element is provided "at least functionally" means, in the sense of the invention, that at least the respective function of the respective shifting element is represented in the motor vehicle transmission according to the invention. The first shifting element and the second shifting element can actually be physically present as individual shifting elements or their function can be represented by another component, such as a shifting device. A component mapping the function then combines the function of the first shifting element and the second shifting element.

A representation of an actuated state of the at least functionally provided first shifting element results in the third element of the second planetary gear set being non-rotatably connected to the output shaft.

According to a first embodiment of the invention, an actuated state of the at least functionally provided second shifting element causes the third element of the second planetary gear set and the second element of the first planetary gear set as well as the first element of the third planetary gear set to be non-rotatably connected to one another. In this embodiment, a first gear can then be shifted between the drive shaft and the output shaft by displaying an actuated state of the second shifting element. Furthermore, a second gear is created between the drive shaft and the output shaft by causing an actuated state of the first shifting element. In an advantageous manner, this allows two different gears to be shifted between the drive shaft and the output shaft, wherein high ratios of the motor vehicle transmission can be represented depending on a choice of stationary ratios of the planetary gear sets, which is thus suitable for use in a motor vehicle in which lower top speeds are to be represented.

According to an alternative, second embodiment of the invention, however, a rotationally fixed connection of the output shaft with the third element of the first planetary gear set and the first element of the second planetary gear set is produced in the actuated state of the at least functionally provided second shifting element. In this design option, a first gear can then be shifted between the drive shaft and the output shaft, for which purpose an actuated state of the first shifting element is displayed. To shift a second gear between the drive shaft and the output shaft, however, an actuated state of the second shifting element must be shown. This also makes it possible to realize two different gears between the drive shaft and the output shaft, wherein lower gear ratios of the vehicle transmission can be represented depending on the stationary ratios of the planetary gear sets. This makes the vehicle transmission suitable for use in a motor vehicle where a lower tractive force is required.

In the context of the invention, an arrangement of an at least functionally provided shifting element between two components means that these components are not permanently coupled to each other, but a coupling is only carried out by displaying an actuated state of the at least functionally provided, intermediate shifting element. An actuated state of the at least functionally provided shifting element within the meaning of the invention means that the relevant shifting element is transferred to a closed state and subsequently adjusts the rotary movements of the components directly coupled thereto. If at least the function of a positive-locking shifting element is mapped, the components directly connected to each other in a rotationally fixed manner will run at the same speed, whereas if at least the function of a non-positive-locking shifting element is mapped, there may be differences in speed between the components even after an actuated state of the same has been mapped. This intentional or unintentional state is nevertheless referred to in the context of the invention as a rotationally fixed connection of the respective components via the at least functionally provided shifting element.

In addition to shifting the different gears, a neutral shift can also be realized in the motor vehicle transmission according to the invention in that an actuated state is not represented for either of the two shifting elements provided at least functionally. This decouples the drive shaft from the output shaft. In an advantageous manner, this allows the at least one drive engine connected to the drive shaft to be uncoupled.

According to a further development of the variant of the invention, in which, in the actuated state of the at least functionally provided second shifting element, the third element of the second planetary gear set is non-rotatably connected to the second element of the first planetary gear set, and the first element of the third planetary gear set, the first shifting element, and the second shifting element are formed by a common shifting device which has a coupling element. The coupling element can be positioned in a first shift position and in a second shift position, wherein the coupling element in the first shift position functionally represents an actuated state of the first shifting element and connects the third element of the second planetary gear set to the output shaft in a rotationally fixed manner. In the second shift position, the coupling element functionally represents an actuated state of the second shifting element and connects the third element of the second planetary gear set non-rotatably to the second element of the first planetary gear set and the first element of the third planetary gear set.

In this case, the function of the first shifting element and the second shifting element is therefore mapped by a shifting device, which enables a particularly compact arrangement. In addition, a positioning actuator can be provided for actuating the two shifting elements, via which the coupling element can be positioned in the different shift positions. Preferably, the coupling element can still be positioned in a neutral position between the shift positions, in which none of the actuated states of the first shifting element and the second shifting element are shown.

Preferably, the coupling element of the shifting device is guided in a rotationally fixed manner and axially displaceable between the two shift positions on a first toothing, which is connected in a rotationally fixed manner to the third element of the second planetary gear set. In the first shift position, the coupling element of the shifting device engages in a second toothing, which is non-rotatably connected to the output shaft. On the other hand, in the second shift position, the coupling element of the shifting device is in meshing engagement with a third toothing, which is non-rotatably connected to the second element of the first planetary gear set and the first element of the third planetary gear set. In particular, the coupling element of the shifting device is designed as a sliding sleeve, wherein the toothing is preferably designed as claw toothing, so that the function of unsynchronized claw shifting elements is mapped via the shifting device. In the context of the invention, however, the first shifting element and the second shifting element could also be present as individual shifting elements, in which case the two shifting elements are designed in particular as positive-locking shifting elements and in this case particularly preferably as unsynchronized claw shifting elements. Alternatively, however, the first shifting element and the second shifting element can also be designed as locking synchronizations or as force-locking shifting elements, preferably as lamellar shifting elements.

In a further variant of the invention, in which, in the actuated state of the at least functionally provided second shifting element, the output shaft is non-rotatably connected to the third element of the first planetary gear set and the first element of the second planetary gear set, the first shifting element and the second shifting element are formed by a common shifting device which has a coupling element. The coupling element can be positioned in a first shift position and in a second shift position, wherein the coupling element in the first shift position functionally represents an actuated state of the first shifting element and connects the third element of the second planetary gear set to the output shaft in a rotationally fixed manner. In contrast, in the second shift position, the coupling element functionally represents an actuated state of the fourth shifting element and connects the output shaft to the third element of the first planetary gear set and the first element of the second planetary gear set in a rotationally fixed manner. This also allows the function of the first shifting element and the second shifting element to be mapped by a shifting device and thus in a compact manner. This also means that only one common positioning actuator is required to display the actuated states, via which the coupling element can be positioned in the different shift positions. Preferably, the coupling element can still be positioned in a neutral position between the shift positions, in which none of the actuated states of the first shifting element and the second shifting element are shown.

In a further development of the aforementioned design option, the shifting device is designed in particular in such a way that the coupling element of the shifting device is guided non-rotatably and axially displaceable between the two shift positions on a first toothing, which is non-rotatably connected to the output shaft. In the first shift position, the coupling element then engages in a second toothing, which is non-rotatably connected to the third element of the second planetary gear set. When transferred to the second shift position, the coupling element comes into meshing engagement with a third toothing, which is non-rotatably connected to the third element of the first planetary gear set and the first element of the second planetary gear set. The coupling element of the shifting device is designed in particular as a sliding sleeve, with the toothing preferably being designed as claw toothing, so that the function of unsynchronized claw shifting elements is mapped via the shifting device. Alternatively, the first shifting element and the second shifting element could also be present in this case as individual shifting elements, wherein the two shifting elements in this case are designed in particular as positive-locking shifting elements and in this case particularly preferably as unsynchronized claw shifting elements. In addition, the shifting elements can also be designed as locking synchronizations or as force-locking shifting elements, wherein these are preferably designed as lamellar shifting elements.

According to one embodiment of the invention, the output shaft is coupled to a differential gear set which couples the output shaft to two pinion shafts. The differential gear set functions in particular as a transverse differential and is preferably designed as a bevel gear differential. The transverse differential formed in this way is preferably used to distribute a drive movement transmitted to the output shaft of the motor vehicle transmission to the pinion shafts, which are preferably assigned to a motor vehicle drive axle. However, the differential gear set can also have the function of a longitudinal differential, which can be used to distribute the drive power to several drive axles. In addition, the differential gear set within the scope of the invention can also be designed as a planetary gear differential, a spur gear differential, etc.

In particular, the output shaft is coupled to an input element, which is preferably a differential basket of the differential gear set. When the differential gear set is used as a transverse differential and the motor vehicle transmission is installed transverse to the direction of travel of the associated motor vehicle, the output shaft is then preferably connected to the input element in a rotationally fixed manner. This is also realized in particular when the differential gear set functions as a longitudinal differential and the vehicle transmission is aligned in the direction of travel of the vehicle. If the vehicle transmission is installed in the direction of travel and the differential gear set is used as a transverse differential, the output shaft is coupled to the input element via a bevel drive. Such a bevel drive is also preferably used when the differential gear set is used as a longitudinal differential and the vehicle transmission is aligned transverse to the direction of travel.

According to one embodiment of the invention, the planetary gear sets are arranged axially following a connection point of the drive shaft, which serves to couple the drive shaft to the drive engine, in a sequence of first planetary gear set, second planetary gear set and third planetary gear set. This makes it possible to achieve a suitable structure for the motor vehicle transmission according to the invention. If the first shifting element and the second shifting element of the motor vehicle transmission are combined to form a shifting device, this shifting device is provided axially between the second planetary gear set and the third planetary gear set, with the shifting device also being arranged in particular radially surrounding the second planetary gear set and the third planetary gear set.

Within the scope of the invention, however, it would also be conceivable in principle to place the first planetary gear set axially at least overlapping with the second planetary gear set and to arrange it radially on the inside of the second planetary gear set. By "axially at least overlapping" is meant that at least one part of the first planetary gear set lies axially in one plane with at least one part of the second planetary gear set. Preferably, the first planetary gear set and the second planetary gear set overlap axially predominantly or even completely, whereby the first planetary gear set and the second planetary gear set are then placed axially at least predominantly in a common plane. In combination with the radially inner arrangement of the first planetary gear set, this enables a nested arrangement of the two planetary gear sets and thus an axially short design. Preferably, the first planetary gear set and the second planetary gear set are then arranged axially between a connection point of the drive shaft, which serves to couple the drive shaft to the at least one drive engine, and the third planetary gear set. Alternatively, or additionally, the third element of the first planetary gear set and the first element of the second planetary gear set could also be designed in one piece.

Another object of the invention is a drive unit which, in addition to an electric engine, has a motor vehicle transmission according to one or more of the variants described above. A rotor of the electric engine is coupled to the drive shaft of the vehicle transmission. In the context of the invention, the electric engine can be operated as a generator on the one hand and as an electric engine on the other. This makes it possible to create a drive unit that is suitable for use in a motor vehicle in the form of an electric or hybrid vehicle.

The electric engine can be non-rotatably connected to the drive shaft of the vehicle transmission, wherein the electric engine is then arranged coaxially to the drive shaft. This means that the drive shaft and the rotor of the electric engine run at the same speed during operation. Alternatively, however, it is also conceivable that the rotor of the electric engine is connected to an intermediate shaft of the vehicle transmission in a rotationally fixed manner, which is coupled to the drive shaft via at least one transmission stage, so that the electric engine may then be axially offset to the drive shaft. Depending on the design of the at least one transmission stage, a coaxial arrangement of the electric engine to the drive shaft is also possible.

A drive unit designed in accordance with one of the aforementioned variants is in particular part of an electrically driven motor vehicle drive axle, which is intended for use in an electric or hybrid vehicle. Preferably, the vehicle transmission has a differential gear set which is coupled to the output shaft and couples the output shaft to pinion shafts. Each of the pinion shafts is assigned to a drive wheel of the vehicle drive axle.

Within the scope of the invention, a motor vehicle drive axle as described above is provided in a hybrid or electric vehicle, which may be a passenger car or a commercial vehicle. A commercial vehicle can be an at least partially electrically powered van or a light to medium-duty bus or truck.

BRIEF DESCRIPTION OF THE DRAWINGS

Advantageous embodiments of the invention, which is discussed in the following, is shown in the drawings. These show in.

DETAILED DESCRIPTION

Figure 1:
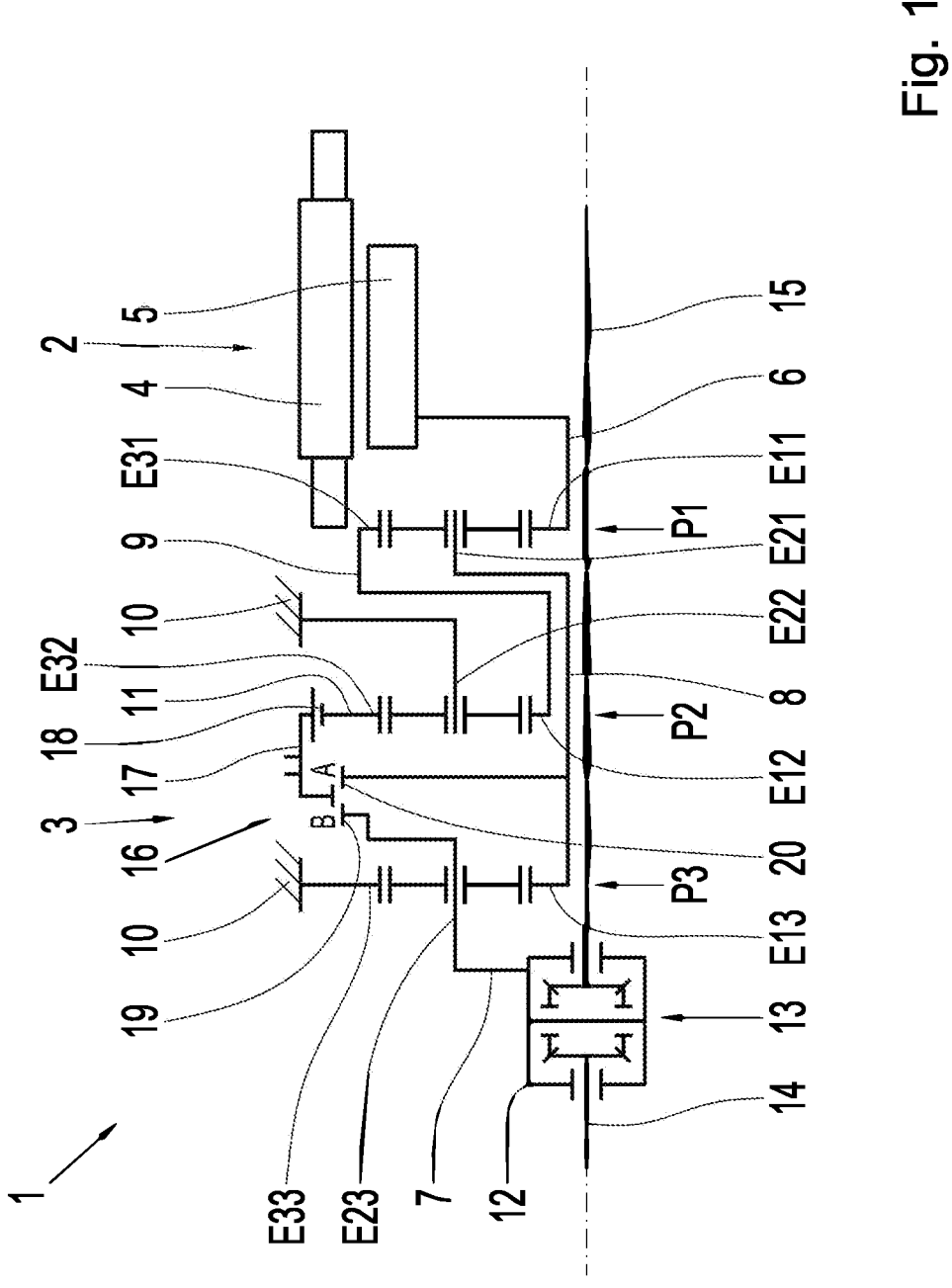
FIG. 1 a schematic view of a drive unit according to one embodiment of the invention.

FIG. 1 shows a schematic view of a drive unit 1, which is designed according to one embodiment of the invention. This drive unit 1 comprises an electric engine 2 and a motor vehicle transmission 3, which is designed in accordance with one possible embodiment of the invention. The electric engine 2 is formed by a stator 4 and a rotor 5 in a manner known in principle to the skilled person, wherein the electric engine 2 can be operated as a generator on the one hand and as an electric engine on the other.

In addition to a drive shaft 6 and an output shaft 7, the vehicle transmission 3 has three planetary gear sets P1, P2 and P3, each consisting of a first element E11 or E12 or E13, a second element E21 or E22 or E23 and a third element E31 or E32 or E33. The respective first element E11 or E12 or E13 of the respective planetary gear set P1 or P2 or P3 is a respective sun gear, while the respective second element E21 or E22 or E23 of the respective planetary gear set P1 or P2 or P3 is designed as a respective planet carrier. The respective third element E31 or E32 or E33 of the respective planetary gear set P1 or P2 or P3 is furthermore a respective ring gear of the respective planetary gear set P1 or P2 or P3.

In the respective planet carrier of the respective planet gear set P1 or P2 or P3, at least one planet gear is rotatably mounted in each case, which is in meshing engagement with both the respective sun gear and the respective ring gear of the respective planet gear set P1 or P2 or P3. The planetary gear sets P1, P2 and P3 are therefore designed here as minus planetary gear sets. Within the scope of the invention, however, a design of one or more of the planetary gear sets P1 to P3 as a plus planetary set is also possible, for which, in comparison to the respective design as a minus planetary set, the respective second element E21 or E22 or E23 is to be formed by the respective ring gear and the respective third element E31 or E32 or E33 by the respective planet carrier. When the respective planetary gear set is designed as a plus planetary gear set, a stationary transmission ratio must furthermore be increased by one compared to a design as a minus planetary gear set. In a plus planetary set, at least one pair of planet gears is rotatably mounted in the respective planet carrier, of which one planet gear is in meshing engagement with the respective sun gear and one planet gear meshes with the respective ring gear. The planetary gears of the at least one planetary gear pair are also in meshing engagement with one another.

In the present case, the first element E11 of the first planetary gear set P1 is non-rotatably connected to the drive shaft 6, which is also non-rotatably connected to the rotor 5 of the electric engine 2. In this respect, the first element E11 of the first planetary gear set P1 and the rotor 5 are also non-rotatably connected to each other via the drive shaft 6, as a result of which the first element E11 and the rotor 5 always rotate at the same speed. In the context of the invention, the drive shaft 6 can be formed in one piece with the rotor 5 of the electric engine 2 and/or with the first element E11 of the first planetary gear set P1.

The second element E21 of the first planetary gear set P1 is connected in a permanently rotationally fixed manner to the first element E13 of the third planetary gear set P3, so that these two elements E21 and E13 also constantly rotate at the same speed. This connection is made via a shaft 8, wherein the shaft 8 could be made in one piece with the second element E21 of the first planetary gear set P1 and/or with the first element E13 of the third planetary gear set P3. Furthermore, the third element E31 of the first planetary gear set P1 and the first element E12 of the second planetary gear set P2 are permanently connected to each other in a rotationally fixed manner, the rotationally fixed connection being produced via a shaft 9, which could be formed in one piece with the third element E31 of the first planetary gear set P1 and/or with the first element E12 of the second planetary gear set P2.

As can also be seen in FIG. 1, the second element E22 of the second planetary gear set P2 is fixed to a permanently fixed component 10 and thus permanently prevented from rotating. The fixed component 10 is preferably a transmission housing of the motor vehicle transmission 3, a part of such a transmission housing or a component that is non-rotatably connected to it. The third element E33 of the third planetary gear set P3 is also permanently fixed to the fixed component 10, as a result of which the third element E33 is also permanently prevented from rotating. The second element E23 of the third planetary gear set P3, however, is non-rotatably connected to the output shaft 7 of the motor vehicle transmission 3, as a result of which the second element E23 of the third planetary gear set P3 permanently rotates together with the output shaft 7. The second element E23 of the third planetary gear set P3 and the output shaft 7 could also be designed in one piece. Finally, the third element E32 of the second planetary gear set P2 is non-rotatably connected to a shaft 11, which is present as a radial shaft piece, and which could be designed in one piece with the third element E32 of the second planetary gear set P2.

In addition to the second element E23 of the third planetary gear set P3, the output shaft 7 is also permanently connected to a differential basket 12 of a differential gear set 13 so that it cannot rotate. This differential gear set 13 is designed as a bevel gear differential, which divides a drive torque introduced into the differential basket 12 via the output shaft 7 to two pinion shafts 14 and 15 in a manner known in principle to the skilled person. The differential gear set 13 enables speed differences between the pinion shafts 14 and 15.

Furthermore, the motor vehicle transmission 3 has a shifting device 16, in which a coupling element 17 in the form of a sliding sleeve is provided. The coupling element 17 is guided non-rotatably and axially displaceable on a toothing 18, which is non-rotatably connected to the shaft 11 and thus also to the third element E32 of the second planetary gear set P2. Axial displacements of the coupling element 17 on the toothing 18 can be carried out via a positioning actuator—not shown here—which is preferably designed as an electromechanical positioning actuator.

The coupling element 17 can be moved between two different shift positions via the positioning actuator, in each of which the coupling element 17 is in meshing engagement with an associated toothing 19 or 20. The toothing 19 is non-rotatably connected to the output shaft 7, while the toothing 20 is non-rotatably connected to the shaft 8 and thus to the second element E21 of the first planetary gear set P1 and the first element E13 of the third planetary gear set P3.

Figure 2:
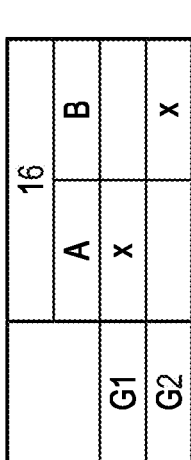
FIG. 2 an exemplary wiring diagram of a motor vehicle transmission of the drive unit from FIG. 1.

The shifting device 16 maps the function of two shifting elements A and B, whose respective actuated state is represented by the shifting device 16 in one of its shift states. Thus, an actuated state of the shifting element A is realized in a first shift position of the coupling element 17, in which the coupling element 17 engages in the toothing 20 and thus connects the shaft 11 to the shaft 8 in a rotationally fixed manner. Accordingly, this also results in a rotationally fixed connection of the third element E32 of the second planetary gear set P2 with the second element E21 of the first planetary gear set P1 and the first element E13 of the third planetary gear set P3 and results in a high transmission ratio from the drive shaft 6 to the output shaft 7. As can be seen in FIG. 2, which shows an exemplary gearshift diagram of the motor vehicle transmission 3 from FIG. 1, a first gear G1 is shifted by displaying the actuated state of the shifting element A.

From the first shift position, the coupling element 17 can be moved via the positioning actuator into a neutral position in which the shaft 11 is not coupled via the coupling element 17. As a result, the drive shaft 6 is also decoupled from the output shaft 7, which also decouples the electric engine 2.

In addition to moving the coupling element 17 into the first shift position, the coupling element 17 can also be moved from the neutral position into a second shift position, in which the coupling element 17 is in meshing engagement with the toothing 20. As a result, the coupling element 17 connects the shaft 11 to the output shaft 7 in a rotationally fixed manner, which results in a lower transmission ratio between the drive shaft 6 and the output shaft 7 compared to the first shift position. An actuated state of the shifting element B is shown, which, as shown in FIG. 2, means the shifting of a second gear G2 of the vehicle transmission 3. Due to the high ratios that can thus be achieved in first gear G1 and second gear G2, the drive unit 1 is particularly suitable for use in a motor vehicle with a rather low top speed.

In the present case, the electric engine 2 is positioned coaxially to the motor vehicle transmission 3, in which the input shaft 6, the planetary gear sets P1 to P3, the output shaft 7, the pinion shafts 14 and 15, the differential gear set 13 and also the shafts 8, 9 and 11 are arranged coaxially to one another. Following the connection of the drive shaft 6 to the rotor 5 of the electric engine 2 axially, the planetary gear sets P1 to P3 are then arranged in the order first planetary gear set P1, second planetary gear set P2 and finally third planetary gear set P3. The shifting device 16 is positioned axially between the second planetary gear set P2 and the third planetary gear set P3. While the pinion shafts 14 and 15 are designed as solid shafts, the input shaft 6, the output shaft 7 and the shafts 8, 9 and 11 are each designed as hollow shafts.

Figure 3:
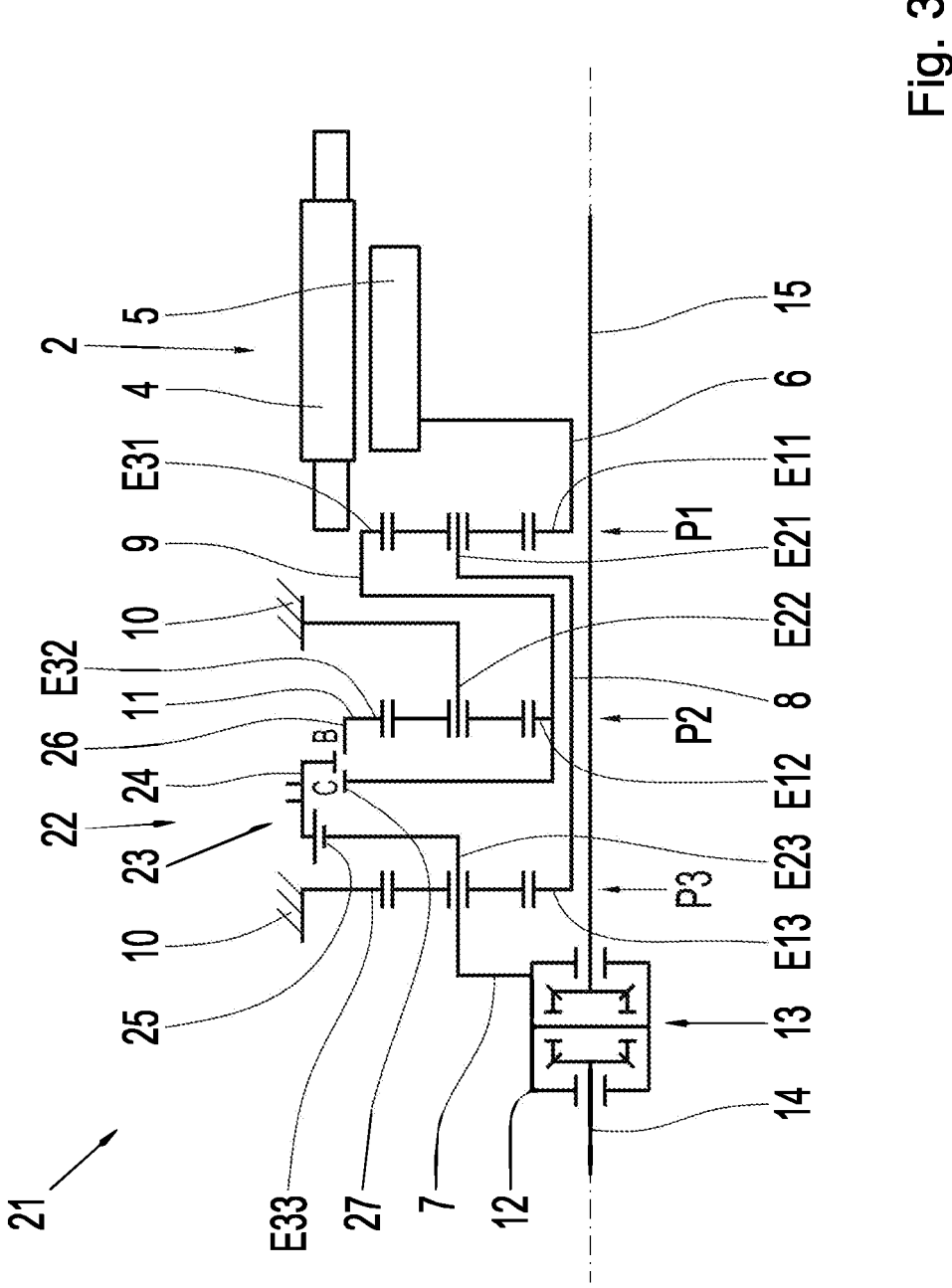
FIG. 3 a schematic representation of a drive unit according to a further embodiment of the invention.

Furthermore, FIG. 3 shows a schematic representation of a drive unit 21, which is designed according to a further possible embodiment of the invention and essentially corresponds to the drive unit 1 of FIG. 1. What is different, however, is that a shifting device 23 with a coupling element 24 is provided in a motor vehicle transmission 22 of the drive unit 21. In addition to a neutral position, the coupling element 24 can be positioned in two different shift positions via an actuator—again not shown here—in which the functions of two shifting elements B and C are mapped by the shifting device 23.

Figure 4:
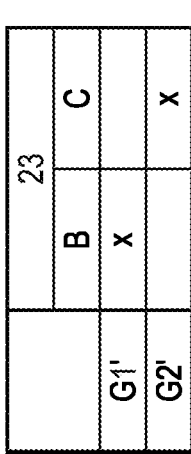
FIG. 4 an exemplary wiring diagram of a motor vehicle transmission of the drive unit from FIG. 3.

The coupling element 24 of the shifting device 23 is rotationally fixed and axially displaceable between the different shift positions on a toothing 25, which is rotationally fixed to the output shaft 7. In a first shift position, the coupling element 24 engages in a toothing 26, which is non-rotatably connected to the shaft 11 and thus also to the third element E32 of the second planetary gear set P2. This depicts an actuated state of the shifting element B and the shaft 11 is non-rotatably connected to the output shaft 7, which also results in a non-rotatable connection of the third element E32 of the second planetary gear set P2 to the output shaft 7. As can be seen in FIG. 4, which shows an exemplary gearshift diagram of the motor vehicle transmission 22 from FIG. 3, this shifts a first gear G1', which corresponds to gear G2 of the motor vehicle transmission 3 from FIG. 1.

The coupling element 24 can be moved from the first shift position to the neutral position, in which neither an actuated state of the shifting element B nor an actuated state of the shifting element C is shown. This decouples the output shaft 7 from the drive shaft 6, which also decouples the electric engine 2 from the output shaft 7.

In addition to a return movement into the first shift position, the coupling element 24 can also be moved from the neutral position into the second shift position, in which, in addition to the permanent meshing engagement with the toothing 25, a meshing engagement with a toothing 27 is produced on the coupling element 24, which is non-rotatably connected to the shaft 9. As a result, the shaft 9 and the output shaft 7 are non-rotatably connected to each other in the second shift position, which results in a non-rotatable connection of the third element E31 of the first planetary gear set P1 and the first element E12 of the second planetary gear set P2 to the output shaft 7. An actuated state of the shifting element C is shown and thus, as can be seen in FIG. 4, a second gear G2' is shifted between the drive shaft 6 and the output shaft 7. This second gear G2' has a lower ratio than the first gear G1'. Due to the lower ratios of the two gears G1' and G2' compared to the vehicle transmission 2, the vehicle transmission 22 is suitable for use in a vehicle that requires a lower tractive force.

Figure 5:
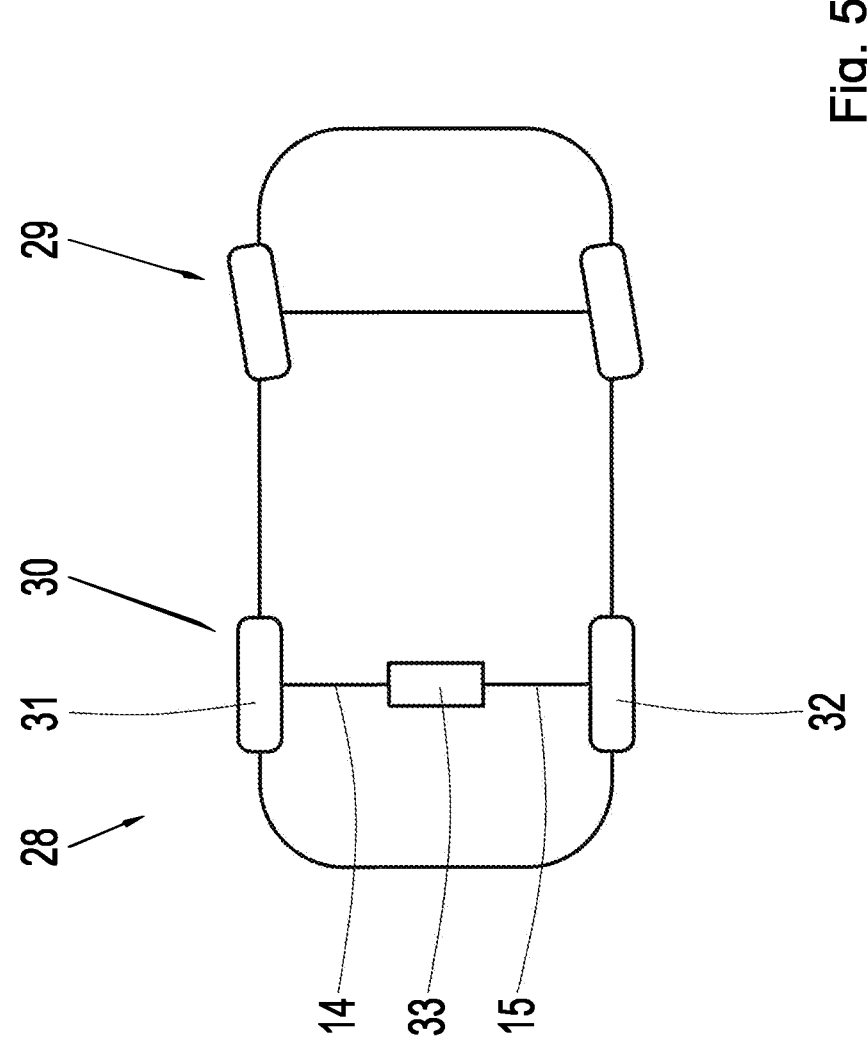
FIG. 5 a schematic view of an electric vehicle according to a preferred embodiment of the invention.

Finally, FIG. 5 shows a schematic view of an electric vehicle 28, which may in particular be an electric commercial vehicle, such as a van. In addition to a steerable, non-driven vehicle axle 29, the electric vehicle 28 also has a motor vehicle drive axle 30 with drive wheels 31 and 32. Part of the vehicle drive axle 30 is also a drive unit 33, which corresponds to one of the variants shown in FIGS. 1 and 3. The drive wheel 31 is connected to the pinion shaft 14 of the drive unit 33, while the drive wheel 32 is connected to the pinion shaft 15 of the drive unit 33.

While the vehicle axle 29 is a front axle of the electric vehicle 28, the vehicle drive axle 30 is a rear axle of the electric vehicle 28. However, as an alternative or in addition to the vehicle drive axle 30, the vehicle axle 29 could also be designed as a driven axle, possibly with an analogous drive unit structure.

By means of the design according to the invention, a compact motor vehicle transmission with a suitable transmission ratio for the integration of an electric engine and with low manufacturing costs can be realized.

LIST OF REFERENCE NUMERALS

1 The drive unit
2 Electric engine
3 Motor vehicle transmission
4 Stator
5 Rotor
6 Input shaft
7 Output shaft
8 Shaft
9 Shaft

10 Fixed component
11 Shaft
12 Differential basket
13 Differential gear set
14 Pinion shaft
15 Pinion shaft
16 Shifting device
17 Coupling element
18 Toothing
19 Toothing
20 Toothing
21 The drive unit
22 Motor vehicle transmission
23 Shifting device
24 Coupling element
25 Toothing
26 Toothing
27 Toothing
28 Electric vehicle
29 Vehicle axle
30 Motor vehicle drive axle
31 Drive wheel
32 Drive wheel
33 The drive unit
P1 First planetary gear set
P2 Second planetary gear set
P3 Third planetary gear set
E11 First element first planetary gear set
E21 Second element first planetary gear set
E31 Third element first planetary gear set
E12 First element second planetary gear set
E22 Second element second planetary gear set
E32 Third element second planetary gear set
E13 First element third planetary gear set
E23 Second element third planetary gear set
E33 Third element third planetary gear set
A Shift element
B Shift element
C Shift element
G1 First gear
G2 Second gear
G1' First gear
G2' Second gear

The invention claimed is:

1. A motor vehicle transmission for an at least partially electrically driven motor vehicle having an electrically driven motor vehicle drive axle and at least one drive engine, the motor vehicle transmission comprising:

a drive shaft configured for coupling to the at least one drive engine;

an output shaft;

a first planetary gear set, a second planetary gear set, and a third planetary gear set, each having a first element, a second element, and a third element in the form of a sun gear, a planet carrier, and a ring gear, respectively;

a first shifting element and a second shifting element, the first and the second shifting elements are alternately actuatable such that only one of the first and the second shifting elements is engaged at time to provide different first and second force flow paths, respectively, from the drive shaft via the first and second planetary gear sets to the output shaft;

wherein:

the first element of the first planetary gear set is non-rotatably connected to the drive shaft;

the second element of the first planetary gear set is connected rotationally fixed to the first element of the third planetary gear set;

the third element of the first planetary gear set is connected rotationally fixed to the first element of the second planetary gear set;

the second element of the second planetary gear set is fixed;

the third element of the third planetary gear set is fixed;

the second element of the third planetary gear set is non-rotatably connected to the output shaft;

in an actuated state of first shifting element, the third element of the second planetary gear set is non-rotatably connected to the output shaft; and in an actuated state of the second shifting element, either the third element of the second planetary gear set is non-rotatably connected to the second element of the first planetary gear set and the first element of the third planetary gear set or the output shaft is non-rotatably connected to the third element of the first planetary gear set and the first element of the second planetary gear set.

2. The motor vehicle transmission according to claim 1, wherein:

in the actuated state of the second shifting element, the third element of the second planetary gear set is non-rotatably connected to the second element of the first planetary gear set and the first element of the third planetary gear set; and the first shifting element and the second shifting element are formed by a common shifting device which has a coupling element operable in a first shift position and in a second shift position, wherein the first shift position functionally represents an actuated state of the first shifting element and brings the third element of the second planetary gear set into a rotationally fixed connection with the output shaft, and wherein the second shift position functionally represents an actuated state of the second shifting element and connects the third element of the second planetary gear set non-rotatably to the second element of the first planetary gear set and the first element of the third planetary gear set.

3. The motor vehicle transmission according to claim 2, wherein:

the coupling element is guided non-rotatably and axially displaceable between the first and second shift positions on a first toothing which is connected non-rotatably to the third element of the second planetary gear set;

in the first shift position the coupling element engages a second toothing that is non-rotatably connected to the output shaft; and in the second shift position the coupling element comes into meshing engagement with a third toothing that is non-rotatably connected to the second element of the first planetary gear set and the first element of the third planetary gear set.

4. The motor vehicle transmission according to claim 1, wherein:

in the actuated state of the second shifting element, the output shaft is non-rotatably connected to the third element of the first planetary gear set and the first element of the second planetary gear set, characterized in that the first shifting element and the second shifting element are formed by a common shifting device which has a coupling element movable between a first shift position and a second shift position, in the first shift position the coupling element functionally represents an actuated state of the first shifting element and connects the third element of the second planetary gear set to the output shaft in a rotationally fixed manner; and in the second shift position the coupling element functionally represents an actuated state of the second shifting element and connects the output shaft non-rotatably to the third element of the first planetary gear set and the first element of the second planetary gear set.

5. The motor vehicle transmission according to claim 4, wherein:

the coupling element of the shifting device is guided non-rotatably and axially displaceable between the first and second shift positions on a first toothing which is connected non-rotatably to the output shaft;

in the first shift position the coupling element engages a second toothing that is non-rotatably connected to the third element of the second planetary gear set;

in the second shift position the coupling element comes into meshing engagement with a third toothing that is non-rotatably connected to the third element of the first planetary gear set and the first element of the second planetary gear set.

6. The motor vehicle transmission according to claim 1, further comprising a differential gear set, wherein the output shaft is coupled to the differential gear set configured to couple the output shaft to two pinion shafts.

7. The motor vehicle transmission according to claim 1, wherein the planetary gear sets are arranged axially following a connection point of the drive shaft, which serves to couple the drive shaft to the at least one drive engine, in a sequence of the first planetary gear set, the second planetary gear set, and the third planetary gear set.

8. The motor vehicle transmission according to claim 7, wherein the shifting device is provided axially between the second planetary gear set and the third planetary gear set.

9. The motor vehicle transmission according to claim 2, characterized in that the shifting device is provided axially between the second planetary gear set and the third planetary gear set.

10. The motor vehicle transmission according to claim 5, wherein the shifting device is positioned axially between the second planetary gear set and the third planetary gear set, and the coupling element is movable such that the force flows from the drive shaft to the output shaft only along the first and the second force flow paths.

11. The motor vehicle transmission according to claim 4, wherein the shifting device is positioned axially between the second planetary gear set and the third planetary gear set.

12. A drive unit for an at least partially electrically driven motor vehicle, the drive unit comprising:

an electric engine with a rotor; and the motor vehicle transmission according to claim 1;

wherein the rotor of the electric engine is coupled to the drive shaft of the motor vehicle transmission.

13. The drive unit according to claim 12, wherein that the rotor is arranged coaxially to the drive shaft and is connected to the drive shaft in a rotationally fixed manner.

14. An electrically driven motor vehicle drive axle for an at least partially electrically driven motor vehicle, comprising the drive unit according to claim 12.

15. A hybrid or electric vehicle comprising a drive unit according to claim 12.

16. A method for operating a motor vehicle transmission, comprising:

providing the motor vehicle transmission of claim 1;

actuating the second shifting element, thereby brining bringing the third element of the second planetary gear set into a rotationally fixed connection with the second element of the first planetary gear set and the first element of the third planetary gear set;

shifting a first gear between the drive shaft and the output shaft by actuating the second shifting element; and shifting a second gear between the drive shaft and the output shaft by actuating the first shifting element.

17. The method for operating a motor vehicle transmission according to claim 16, wherein actuating the second shifting element includes connecting the output shaft non-rotatably to the third element of the first planetary gear set and the first element of the second planetary gear set, and the method further comprises:

shifting the first gear between the drive shaft and the output shaft by representing an actuated state of the first shifting element; and shifting a second gear is shifted between the drive shaft and the output shaft by representing an actuated state of the second shifting element.

* * * * *